United States Patent [19]

Baggioli

[11] Patent Number: 4,646,717
[45] Date of Patent: Mar. 3, 1987

[54] VESSEL FOR COOKING FOOD AND THE LIKE

[76] Inventor: Giuseppe Baggioli, Via Como, 4, Lecco, Italy

[21] Appl. No.: 761,608

[22] Filed: Aug. 1, 1985

[30] Foreign Application Priority Data

Aug. 7, 1984 [IT] Italy .............................. 22251 A/84
Dec. 21, 1984 [IT] Italy .............................. 24219/84[U]

[51] Int. Cl.⁴ .................................................. A47J 27/00
[52] U.S. Cl. ..................................... 126/373; 126/376; 126/387; 126/389; 126/390; 99/447; 220/85 E; 220/206; 220/367; 220/408
[58] Field of Search ............... 220/85 E, 85 P, 94, 220/95, 96, DIG. 21, DIG. 27, 367, 408, 206; 137/532, 533, 534; 126/376, 373, 374, 375, 387, 389, 390; 99/447

[56] References Cited

U.S. PATENT DOCUMENTS

| | | | |
|---|---|---|---|
| 1,493,410 | 5/1924 | Wolcott | 137/533 |
| 2,322,871 | 6/1943 | Mollenhauer | 220/94 R |
| 2,565,964 | 8/1951 | Graham et al. | 220/203 |
| 2,939,606 | 6/1960 | Durbin | 220/408 X |
| 3,209,746 | 10/1965 | Giuseppe | 220/203 X |
| 3,395,695 | 8/1968 | Nagashima et al. | 220/206 X |
| 3,527,247 | 9/1970 | Pelster | 137/533 X |
| 3,934,748 | 1/1976 | Racz | 220/408 |
| 3,982,479 | 9/1976 | Sova | 99/447 |
| 4,206,842 | 6/1980 | Burridge, Jr. | 220/408 X |
| 4,210,072 | 7/1980 | Pedrini | 99/447 X |

FOREIGN PATENT DOCUMENTS

| | | | |
|---|---|---|---|
| 548759 | 3/1932 | Fed. Rep. of Germany | 126/373 |
| 2157678 | 5/1973 | Fed. Rep. of Germany | 126/389 |
| 2834397 | 2/1980 | Fed. Rep. of Germany | 220/203 |
| 1188831 | 9/1959 | France | 220/203 |
| 184256 | 3/1936 | Italy | 99/447 |
| 23808 | of 1896 | United Kingdom | 220/94 A |
| 151685 | 10/1920 | United Kingdom | 126/373 |
| 255915 | 8/1926 | United Kingdom | 126/373 |

*Primary Examiner*—Randall L. Green
*Attorney, Agent, or Firm*—Darby & Darby

[57] ABSTRACT

The present invention relates to the technical field of kitchen-ware and more particularly to a vessel for cooking food and the like. The technical problem to be solved resides in how to accomplish a vessel of the above mentioned type which may be particularly effective in carrying out a quick and uniform cooking of the food. This problem is solved by a vessel (1) in which the side wall (5) of the vessel basin (2) is contiguous to an additional side band (8) susceptible of forming, together with the side wall itself, a hollow annular space (10) into which the flame is directed. A lid (7) adapted to keep the inside of the vessel under a partial overpressure is also provided.

11 Claims, 16 Drawing Figures

VESSEL FOR COOKING FOOD AND THE LIKE

FIELD AND BACKGROUND OF THE INVENTION

The present invention relates to a vessel for cooking food and the like.

It is known that pots and pottery presently used for cooking food, heating liquids and the like may be of different kinds. The shape of said vessels is usually defined by a basin on which a lid can be fitted. Said basin is always provided with handles for lifting it.

It use said vessels are disposed with their bottom directly in contact with the flame of a burner or the like. The flame grazes said bottom but usually it rises in a vertical direction too, as well as tangentially to the side walls extending from said bottom. Such vessels which meet very simple construction requirements, have however many specific drawbacks.

In fact, much of the heat produced by the flame is not used but merely dispersed upwardly, in the vicinity of the side walls of the vessel. As a result there is a high energy consumption and a long cooking period is required.

It is also important to note that with a vessel of the above type the flame does not uniformly heat the different parts of the vessel itself. In fact the bottom is brought to a high temperature while the side wall, above all close to the upper edge, has a much lower temperature. It results in a non uniform cooking of the food and in the practical impossibility of establishing the most appropriate cooking temperature in a precise manner.

Furthermore, the flame grazing the side walls of said vessels very often causes the handles designed for lifting them to be burnt. The phenomenon is so diffused and important that many pots are provided with handles merely consisting of bent metal bars without the presence of any insulating material adapted to avoid burning. Also, from a practical point of view such pots are not adapted to be brought directly to the table, except some pots made of very expensive materials. In fact the bottom of said pots, which was in contact with the flame, has a very high temperature and therefore the pots themselves can only rest on suitably arranged supporting elements. Furthermore, the walls too as well as the handles of said vessels have very high temperatures, which causes the latter to be transported and/or handled with some difficulties.

A further important remark relative to the present technique in the field of vessels for cooking food and the like directly relates to the cooking step. Presently it can be executed only in two ways: by keeping the inside of the vessel at room temperature or by cooking under pressure by means of suitable apparatus called "pressure-cookers". Practically it is not possible to cook under weak overpressure, exploiting the weight of the vessel lid which tends to keep the vessel closed. In fact on increasing the pressure inside the pot or the like, the cover tends to move up and in some cases in turns over. In order to avoid these risks usually vessels are only partially covered.

SUMMARY OF THE INVENTION

Under this situation the main object of the present invention is to provide a vessel for rapidly and uniformly cooking food and the like, adapted to obviate the above mentioned drawbacks.

This object is attained by a vessel for cooking food and the like comprising a basin provided with a bottom and a side wall extending from the edge of said bottom and including a lid engageable with said basin and susceptible of being raised by means of a handle, and further comprising an additional band extending downwardly from the upper edge of said side wall in order to form an annular hollow space therewith into which the flame in contact with said bottom is directed.

BRIEF DESCRIPTION OF THE DRAWINGS

Further features and advantages will become more apparent from the description of some preferred embodiments of the invention, given by way of example only with reference to the accompanying drawings, in which.

DESCRIPTION OF THE PREFERRED EMBODIMENTS

Referring to the drawings, the vessel of the invention is generally identified at 1. In all alternative embodiments said vessel 1 comprises a basin 2 provided with a bottom 3 from the rounded edge of which a side wall 5 extends. In addition, said vessel 1 comprises a handle 6 and a lid 7.

Advantageously, according to the invention the side wall 5 is contiguous to an additional band 8 extending downwardly from the upper edge 9 of the side wall 5. The additional band 8 continues downwardly beyond the level of bottom 3.

Figure 2:
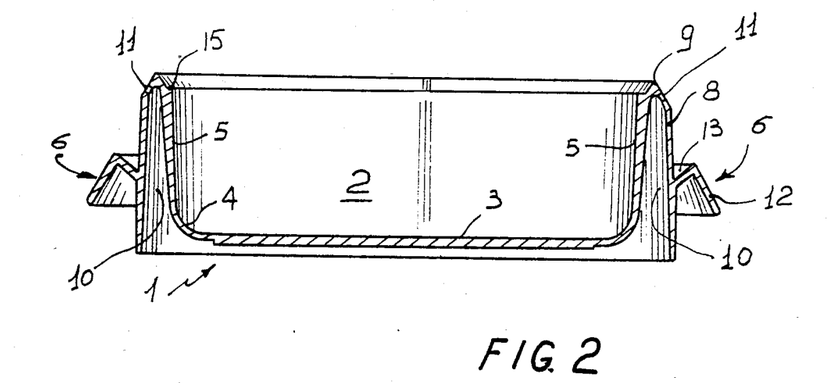
FIG. 2 is a vertical section of the vessel itself without its lid.
Figure 3:
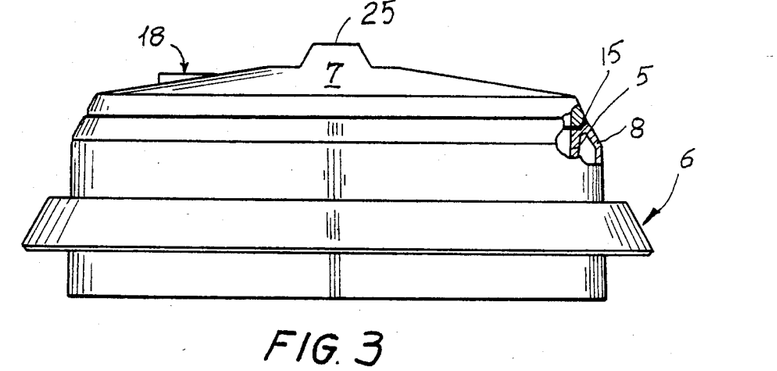
FIG. 3 is an elevation view of the vessel seen in FIG. 1.

In the first embodiment seen in FIG. 2 the additional band 8 is integral to the side wall 5 and it looks like a bent portion thereof. The additional band 8 substantially defines, together with the side wall 5, an annular hollow space 10 into which the flame in contact with the bottom 3 is directed. As also seen in FIG. 2, openings 11 are provided in the upper part of the annular hollow space 10; they are designed for defining a vent for the air and burnt gases.

Advantageously it is also provided that the bottom 3 and the side wall 5 substantially have the same thickness while the edge 4 or connecting portion between the bottom 3 and the side wall 5 has a smaller thickness. By way of example, if the bottom 3 and the side wall 5 have a thickness of about 5 mm, the edge or connecting portion 4 can have a thickness of about 3 mm.

It is also provided that the handle 6 should comprise a ring extending from the additional band 8. Said ring consists of a plate 12 and a crosspiece 13 interposed between the additional band 8 and the plate 12. The latter is advantageously inclined in a converging direction towards the additional band 8 from the side of the upper edge 9 of vessel 1. The crosspiece 13 is further provided with wide slits 14 (FIG. 1).

Figures 4, 5, 6, 7, 8:
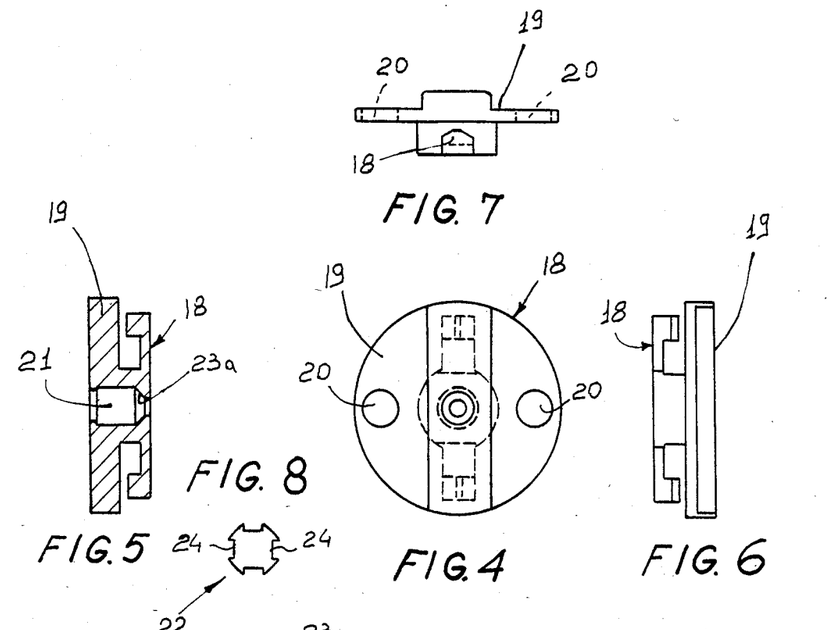
FIG. 4 is a plan view of an element adapted to be fitted on the vessel lid seen in the preceding figures.
FIGS. 5, 6 and 7 are a sectional view, a side view and an elevation view respectively of the element shown in FIG. 4.
FIGS. 8 and 9 are two views taken at 90 degrees from each other of a peg insertable into the element shown in FIG. 4.
Figure 9:
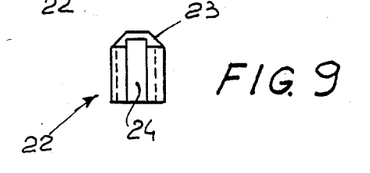

The form of the lid 7 is complementary to that of the upper edge 9 of basin 2 and it sealingly fits into a cavity 15 provided in the upper edge 9 itself. As seen in FIG. 1, the lid 7 is provided with vents 16 and with a through opening 17. An engagement group 18 comprising a disc 19 (see FIGS. 4 to 7) is susceptible of being fitted thereinto. The disc 19 is provided with additional holes 20 quite similar to vents 16 and it can rotate so that it may alternatively open and/or close the vents 16. The opening condition of said vents 16 is obtained by bringing the same into register with the additional holes 20. In the middle of the disc 19 there is a through duct 21 which is in communication, by means of the through housing 17, with the inside of vessel 1. The duct 21 is engaged by a peg 22 (FIGS. 8 and 9).

The end portion of said peg 22 is provided with a sealing surface 23 of truncated conical form exactly mating with the truncated conical form of a respective surface 23a obtained along the duct 21. Parallelly to the axis of the peg 22 provision is also made for some vent slits 24. The presence of said slits 24 causes the sealing surface of peg 22 to be exclusively the one identified at 23. Said peg 22 is hollow so that it may be filled with lead, mercury and other substances having a high specific weight. This is done for the purpose of giving the peg 22 a very precise and suitably adjustable weight.

Figure 1:
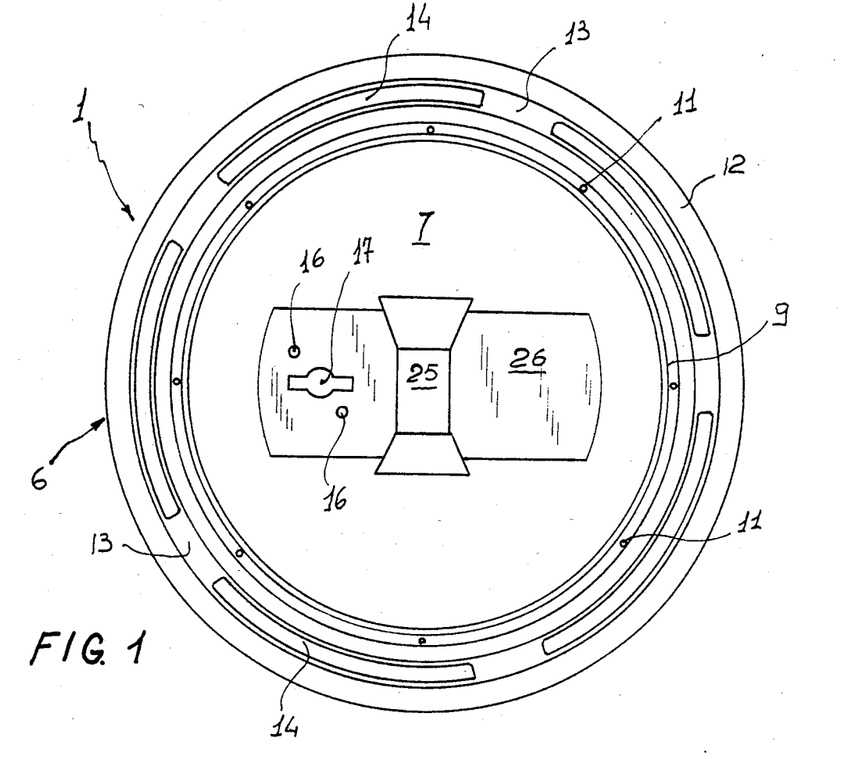
FIG. 1 is a top view of a first embodiment of the vessel according to the invention, equipped with its lid.

Furthermore, FIG. 1 shows that a furrow 26 is obtained on the upper part of lid 7, in the middle thereof, below the handle 25. Said furrow 26 defines a substantially horizontal surface on which the vents 16 and the through housing 17 are obtained. The furrow 26 can be advantageously engaged by additional locking elements for the lid 7. These elements can be diametrically placed upon the lid 7 passing below or over the handle 25 and they finally engage with vessel 1 due to the presence of lugs easily obtainable in the additional band 8.

Figure 10:
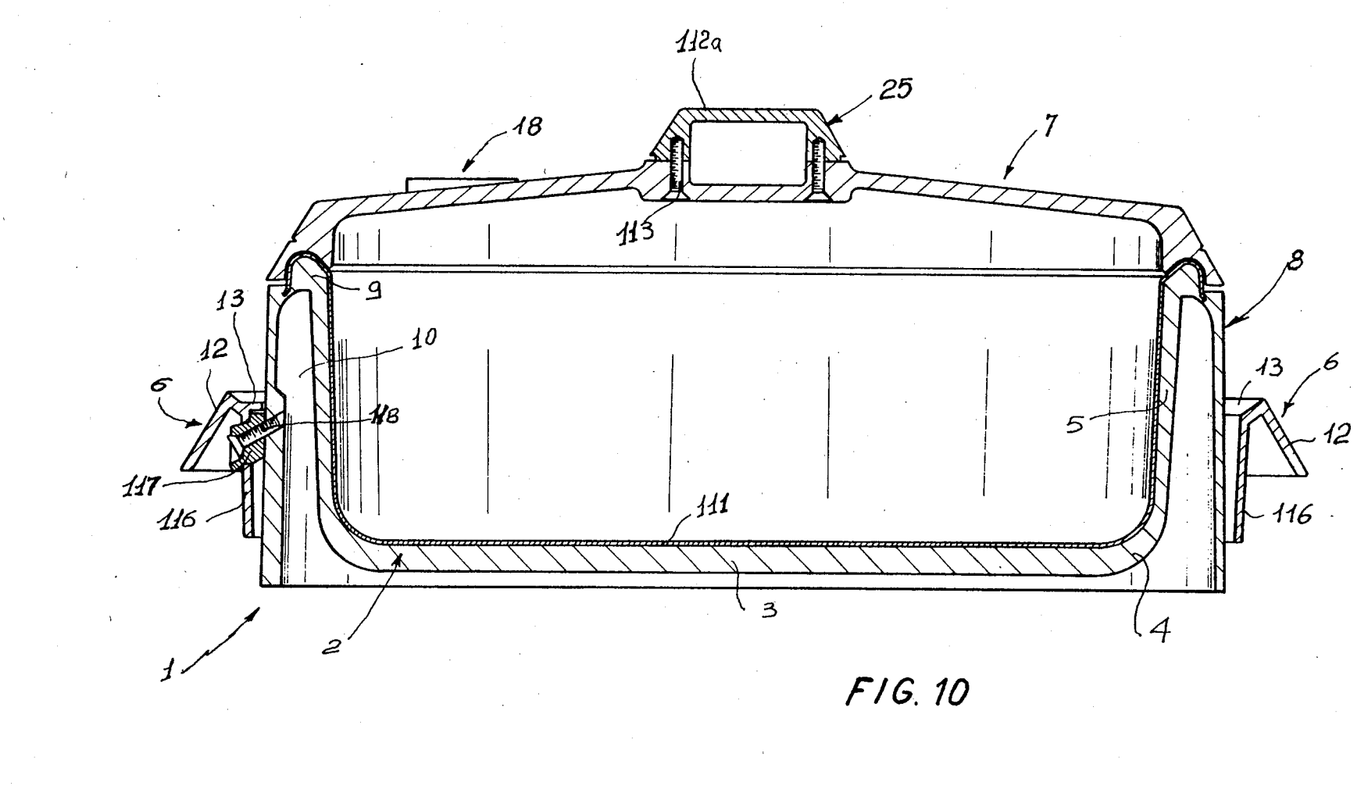
FIG. 10 is a sectional view of a second embodiment of the vessel according to the invention, equipped with its lid.
Figure 11:
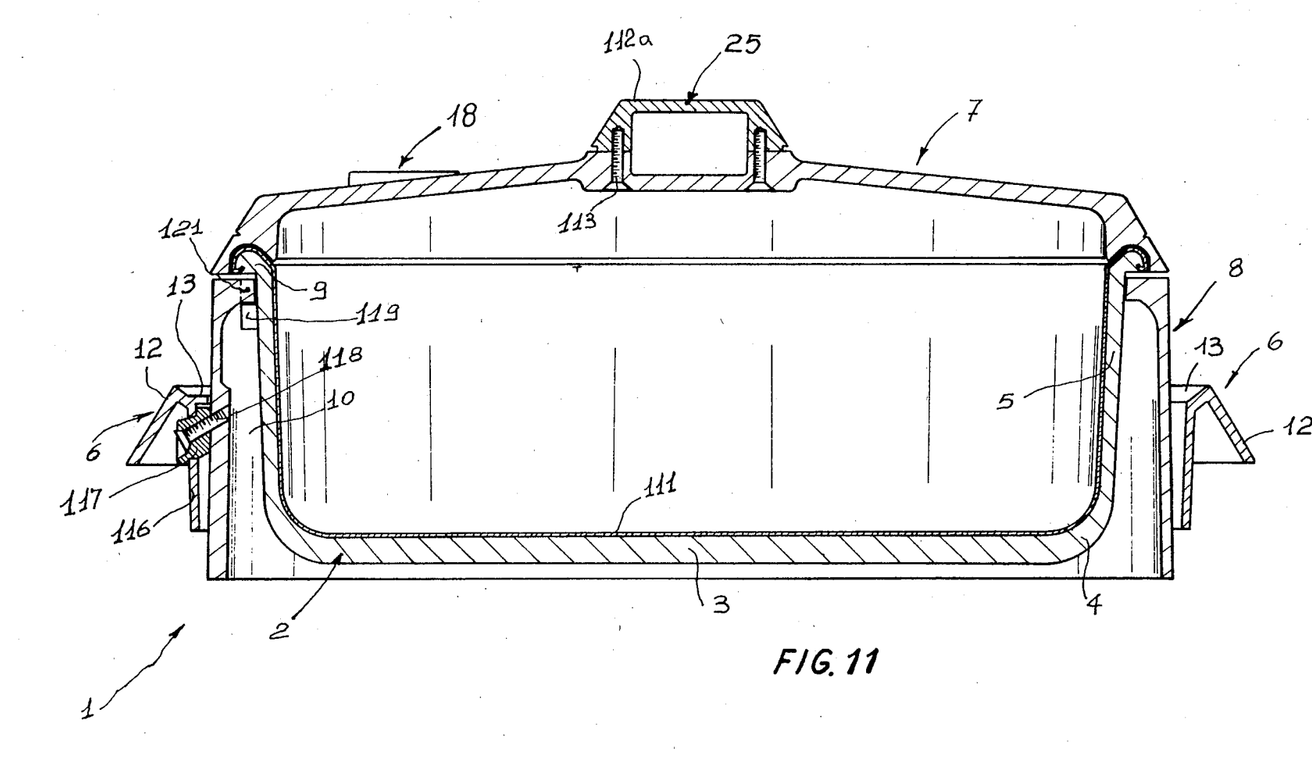
FIG. 11 is a further embodiment of the vessel as seen in FIG. 1.

In the embodiment seen in FIGS. 10 and 11, the basin 2 is inwardly covered with an additional basin 111 in direct contact with the food. The additional basin 111 can take the most different shapes, above all close to the bottom 3 thereof, according to the food for which said basin is designed.

Figure 12:
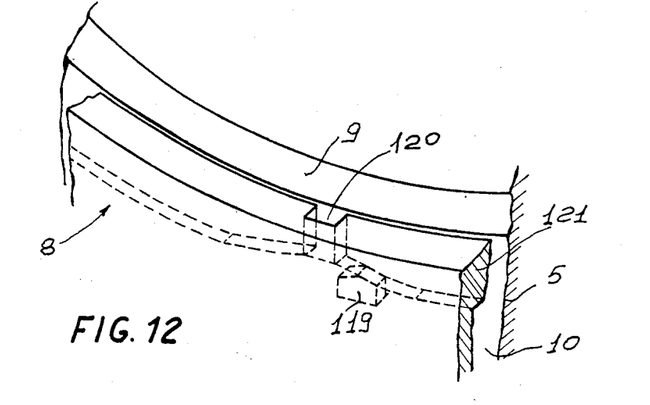
FIG. 12 is a perspective diagrammatic and partial view of one edge of the vessel seen in FIG. 11.
Figure 13:
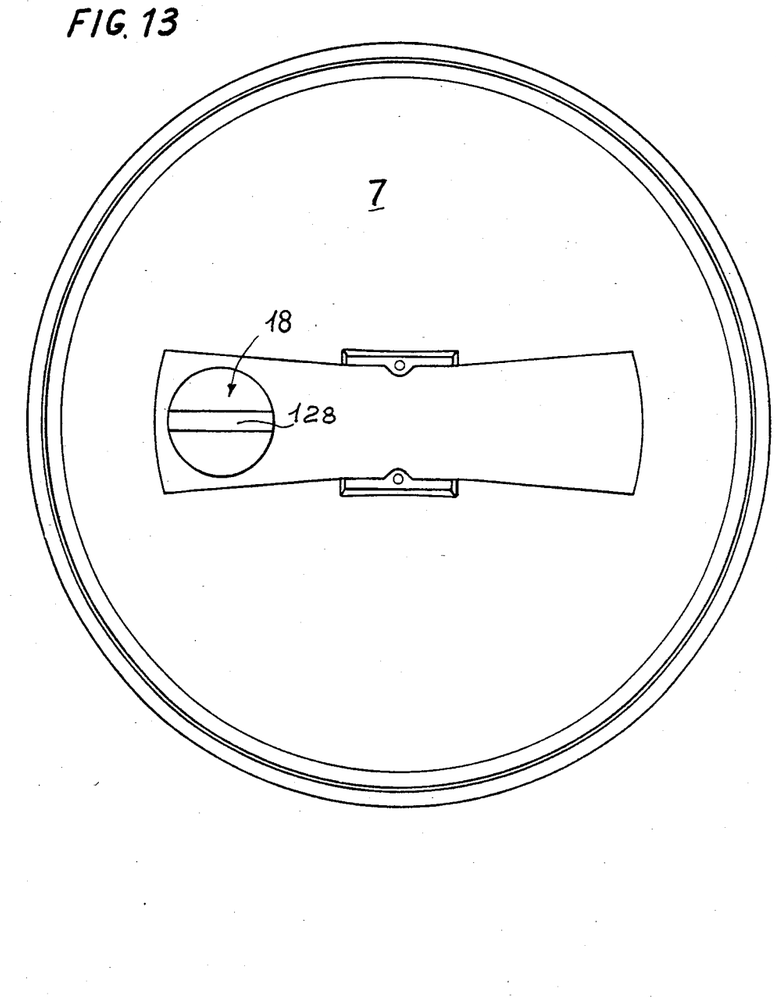
FIGS. 13 and 14 are a plan and a sectional view respectively of the lid seen in FIGS. 10 and 11 devoid of one portion of its handle and provided with the element shown in FIGS. 11a and 11b.

Preferably the additional basin 111 is made of stainless steel or of Teflon-treated aluminium 999. The additional basin 111 extends as far as it covers the upper edge 9 of basin 2 into which it is buried, as shown in FIGS. 11 and 12. The upper edge 9 is advantageously rounded off and it perfectly mates with a corresponding cavity provided on lid 7 and identified at 9a in FIG. 14.

The portions of vessel 1 susceptible of being touched by the hands are preferably of thermo-insulating plastic material. More particularly, the handle 25 for holding the lid 7 consists of a portion 112a made of thermoplastic polyesters and is attached to lid 7 by means of screws 113.

Like the handle 25, the handle 6 is made of thermoplastic polyesters as well. Furthermore, in FIGS. 10 and 11 said handle 6 comprises not only a ring extending from the additional band 8 and consisting of a plate 12 and a crosspiece 13 interposed between the additional band 8 and plate 12, but also a protection wall 116 extending downwardly from the crosspiece 13.

It should be understood that the handle 6 as seen in FIGS. 10 and 11 is not in direct contact with the additional band 8 due to the fact that the crosspiece 13 too is slightly spaced apart from the additional band 8 itself. The engagement between the handle 6 and the additional band 8 itself. The engagement between the handle 6 and the additional band 8 is ensured by some blocks 117 made of thermosetting plastic material laying on the additional band 8 and retaining the protection wall 116 by a restrained fixing.

FIGS. 10 and 11 show that screws 118 are oblique so that even if they are strongly tensioned no contact exists between the crosspiece 13 and the additional band 8.

In FIGS. 11 and 12 it is possible to see that the additional band 8 can be fastened to basin 2 in a removable manner. In fact it can be lowered inside the additional band 8 and fixed to the same by a bayonet engagement. For the purpose the side wall 5 is provided with projections 119 adapted to cross the slits 120 provided on the additional band 8. Said projections 119 are then insertable, by means of a forced rotation, below an annular rim 121 inwardly surrounding the additional band 8. Conveniently said projections 119 and annular rim 121 are inclined so that they allow the locking of the parts to occur after a certain rotation.

Figure 11A:
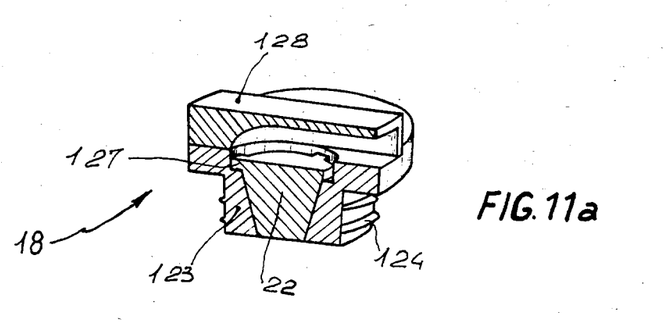
FIGS. 11a and 11b are a perspective and a sectional view respectively of a further element adapted to be associated by screwing with the lids shown in FIGS. 10 and 11.
Figure 11B:
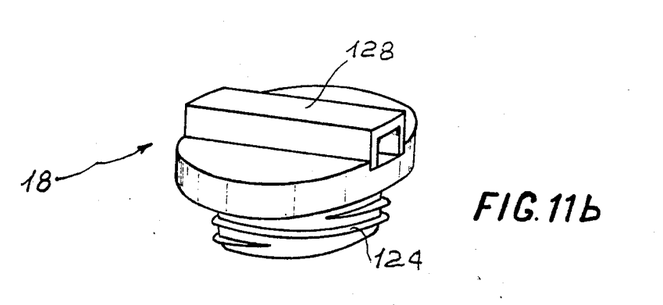
Figure 14:
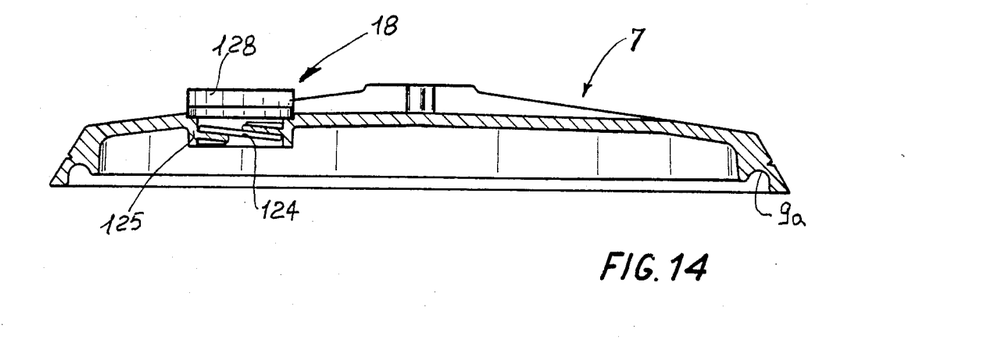

FIGS. 11a, 11b and 14 show the engagement group 18: its assembling by screwing allows the cooking of food under a weak overpressure. At the bottom of said engagement group 18 there is a tailpiece 123 provided with a screw thread 124 insertable in a suitable housing 125 of lid 7. Inside said tailpiece 123 is introduced said peg 22 of conical form and provided with guide and support tabs 127. Said peg 22 acts as a sealing element when its weight holds it in its respective conical housing while it allows a good passage of steam when it is in a raised position. Due to the wide size of peg 22, the hollow space for the passage of steam is sufficient even when a great amount of water is boiling.

A deflector 128 is located above the peg 22; in an original manner it is designed for deviating the steam in a horizontal direction instead of upwardly, and exactly towards the side opposite the handle 25. Therefore the hand of a person holding the handle 25 is always protected.

The operation and the use of the vessel according to the invention are the following.

When a vessel 1 is placed on a burner the flame first grazes the bottom 3 then, going past the edge or connecting portion 4, comes in contact with the side wall 5. There the flame cannot disperse as it is contained inside the annular hollow space 10 avoiding every heat dispersion. So practically all heat produced by the flame is used for heating the basin 2.

The position of the flame completely inside the annular hollow space is promoted by the downwardly extension of the additional band 8. Furthermore, in order to ensure the same heat along the bottom 3 and the side wall 5, they both are made with substantially identical thicknesses. On the contrary, the edge or connecting portion 4 has a lower thickness than the bottom 3 and side wall 5. This lower thickness causes the edge 4 to immediately reach a higher temperature with respect to bottom 3 and wall 5. That causes the so-called "stack effect" with a rapid passage of flame and air that are kept close to the basin 2 and are therefore directed inside the annular hollow space 10. The higher temperature along the edge 4 is advantageous as, on one hand, it gives rise to the "stack effect" with a rapid and adherent flow of the flame and, on the other hand, due to the exiguity of edge 4 as to the surface extension thereof, said edge does not substantially modify the temperature created by the bottom 3 and side wall 5 inside the basin 2. In addition the openings 11, the size of which can be chosen at will, represent the final vent for air and burnt gases.

It should be understood that cooking can take place at room temperature when vents 16 are in register with the additional holes 20, or under a slight over-pressure when vents 16 are closed. In this case the overpressure is determined by the weight of lid 7 and by the suitably adjusted weight of peg 22. In more detail, the latter is provided in such a way that it can be raised a short time before the pressure inside the basin 2 may cause the lifting of lid 7. As soon as it is raised, the peg 22 allows the steam in excess to escape therethrough owing to the presence of slits 24 through which the air and steam passage can take place freely, so that the right equilibrium between the load on the lid (inner pressure by lid surface) and the weight of the same is established.

In the embodiment shown in FIGS. 10 to 14 a special thermal insulation adapted to protect the hands of a person handling the vessel has been envisaged. In fact not only the portions of said vessel directly in contact with the hands are made of thermo-insulating plastic material, but in addition the handle 6 is spaced apart from the additional band 8 and furthermore possible steam jets are always directed away from the handle 25.

The presence of an additional basin 111 allows the basin 2 to be given the desired shape as to its surface directly in contact with the food. The purchase of vessels provided with differently shaped basins 111 is not particularly expensive because it is possible to replace only the basin 2 and not also the additional band 8 and lid 7, which can be done in a quick, easy and precise manner. The only replacement of basin 2 is also useful when the same has to be removed being worn.

The vessel according to the invention attains important advantages. In particular some experimental tests have proved that with these vessels it is possible to save energy and that the cooking time can be reduced, being about one third with respect to the traditional vessels.

The arrangement of an additional band provided with a lower end freely laying on a table and allowing the bottom not to be in contact with the table itself is also very advantageous.

Finally it should be emphasized that said apparatus is very useful for cooking food under a slight overpressure.

What is claimed is:

1. A cooking vessel, which comprises:
   a first basin, the first basin including a bottom, a side wall and a bottom edge portion periphery surrounding the bottom and interconnecting the side wall and the bottom, the bottom and the side wall of the first basin having substantially equal thicknesses, the bottom edge portion of the first basin having a thickness which is less than those of the basin side wall and bottom, the side wall having an upper edge;
   a band mounted on and extending from the upper edge of the side wall and at least partially surrounding at least a portion of the side wall, the band and the side wall defining therebetween a space adapted to receive a portion of a flame directed in contacted with the bottom;
   a lid adapted to engage and be removed from the first basin, the lid including a top surface and having a furrow formed in the top surface, and including a knob mounted on the top surface for removing the lid from the first basin, the lid having an opening formed through its thickness;
   means for releasing pressure from the interior of the basin, the pressure releasing means including a disc received by the lid opening, a duct formed through the disc, and a weighted peg received by the duct and movable therein; and
   a handle, the handle including a cross-piece member which engages the band, and a plate joined to the cross-piece member and extending therefrom at an angle outwardly from the basin side wall, the cross-piece member having formed therein a slit.

2. The vessel according to claim 1, wherein the band includes a plurality of second openings formed therein, the second openings being in communication with the space defined between the band and the side wall to allow air and burnt gasses to escape therethrough.

3. The vessel according to claim 1, wherein the band includes a lower free end; and wherein said handle further includes a protection wall extending from said cross-piece member towards the lower free end of said band.

4. The vessel according to claim 3, wherein a portion of said handle is spaced apart from the band and is connected thereto in a removable manner; and wherein the vessel further comprises at least one block made of thermosetting plastic material, said at least one block being interposed between and joined to the handle and the band, and further comprises at least one screw securing the block to the band, the screw being disposed obliquely so that by tightening the screw a portion of said protection wall which is radially the most spaced apart from said band is adjusted to be positioned close to the band.

5. The vessel according to claim 1, which further comprises a second basin disposed in the interior of the first basin.

6. The vessel according to claim 5, wherein said second basin extends to said upper edge of the side wall.

7. The vessel according to claim 1, wherein said pressure releasing means further includes a deflector disposed above the peg and adapted to direct steam away from the central region of the lid.

8. The vessel according to claim 1, wherein said lid has formed therein a vent hole, and wherein the disc of the pressure releasing means has formed therein an opening, the disc being rotatably mounted on the lid and positionable so that the disc opening may be selectively brought into register with the lid vent hole.

9. The vessel according to claim 1, wherein said peg includes with a frusto-conical end, and has a side surface having slits formed therein.

10. The vessel according to claim 1, wherein said peg is of conical form and includes guide and support tabs projecting from an upper end of the peg.

11. A cooking vessel as defined by claim 1, which further comprises means for removably mounting and locking the band to the first basin, the band removing and locking means including a projection formed on the basin side wall and extending outwardly therefrom, and a cooperating opening formed in the band, the opening being situated and dimensioned to receive the side wall projection; and wherein the band includes an inclined surface adjacent the opening formed therein, and the projection includes a corresponding inclined surface, the band being positionable relative to the first basin in a first position wherein the projection of the basin side wall is aligned with and received by the band opening to allow the band to be mounted on the first basin, and a second position wherein the inclined surface of the projection wedgingly engages the inclined surface of the band to lock the band to the first basin.

* * * * *